July 4, 1939.   W. KIMMICH   2,164,526
OPTICAL SYSTEM
Filed May 8, 1936
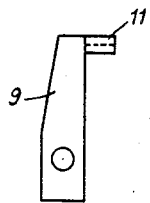
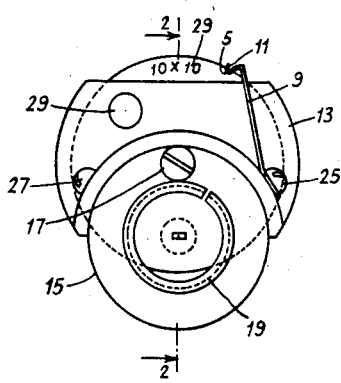
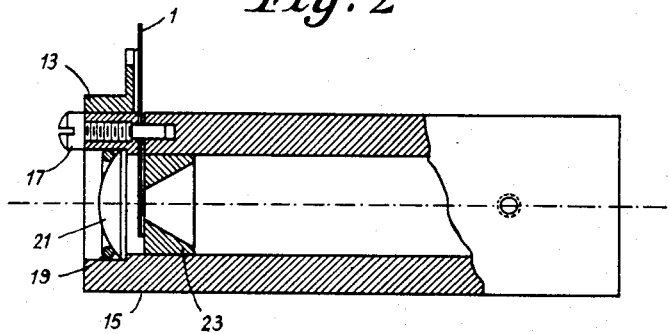
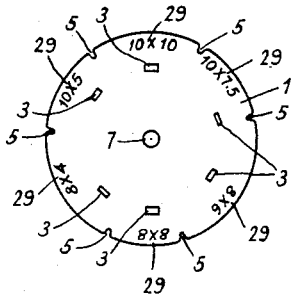
INVENTOR
WILLIAM KIMMICH
BY H.G. Grover
ATTORNEY Patented July 4, 1939

2,164,526

UNITED STATES PATENT OFFICE 2,164,526

OPTICAL SYSTEM

William Kimmich, Flushing, N. Y., assignor to Radio Corporation of America, a corporation of Delaware Application May 8, 1936, Serial No. 78,557

1 Claim. (Cl. 88—1)

This invention relates to optical systems, and more particularly, to those optical systems from which it is desired to have variable diaphragm openings, such as are useful for facsimile transmission.

In facsimile systems, or in fact, in any transmission system which utilizes a scanning process and requires the "dissecting" of an image into elemental areas, it is necessary to provide an optical system which will pick up light whose dimensions are generally fixed by the rate of scanning. For example, in one of the well known facsimile systems where the object to be transmitted is mounted on a rotating drum, the scanning arrangement is mounted on a shaft which is threaded and which is parallel to the axis of the drum. The shaft rotates at a fixed ratio with respect to the rotation of the drum and the carriage upon which the scanning arrangement or scanning head is mounted, has a threaded nut which engages with the threads of the shaft. Accordingly, therefore, as the shaft rotates, the carriage advances at a rate determined by the rotation of the shaft and the number of threads per inch. The advancement of the scanning head causes, when the drum rotates simultaneously with it, the tracing out of an helical path, the pitch of which is determined by the relative speeds of the drum and shaft. This pitch is generally made variable between 60 and 150 lines per inch. Accordingly, therefore, it is desirable that the optical system cooperating with the scanning head, shall pick up light from an area, the width of which shall be equal to the inverse of the pitch.

For example, if the pitch is 60 lines per inch, the width of the scanned line to be determined by an aperture in the diaphragm located in the optical system, should be 1/60 of an inch. If the pitch is increased to 100 lines per inch, then the width of the aperture should be 1/100 of an inch. The height of the slot should be made as small as possible in order to overcome what is known as "apertured distortion". Due to the fact that a finite height of aperture must be used, the light passed by the aperture is not, at every instant, indicative of the elemental area being scanned, since as the drum rotates, if there is an abrupt change from black to white in the picture to be transmitted, the actual light passed by the aperture will at one instant be that light reflected from half of the black portion and half of the white portion, and accordingly, the light value, as far as the scanning head is concerned, is that intermediate between the black and white. Obviously, the smaller the height of the aperture, the smaller this distortion will be. On the other hand, the height cannot be made too small, for then the amount of light passed by the optical system to a photo-sensitive device which is used for converting the light impulses into electrical signalling energy, will be so meagre as to render the problem of amplifying the electrical impulses to a point where they are usable for transmission over wire channels, or by radio, so difficult that extraordinary means must be employed to transmit a picture lacking distortion.

This particular limitation and type of distortion is well known and appreciated, and appears in the form of a detailed discussion in a series of papers appearing in the Bell Systems Technical Journal, volume 6, No. 4, October, 1927, and in particular, the paper entitled "The Production and Utilization of Television Signals" by Gray, Horton and Mathes on page 560. It will be appreciated that the final selection of a proper value for the height of the aperture will be determined not only by the limits of amplification, which may be obtained in practical cases, but also by the scanning speed; that is, the relative rate at which the scanned material passes in front of the optical system of the scanning head. If the speed is relatively slow, then the aperture height may be increased over the condition where the speed is high in which case the aperture must be reduced in order to maintain a constant percentage of aperture distortion. Accordingly, therefore, it will be appreciated that any scanning system in which the rate of scanning and the pitch of scanning are variable, requires an optical system in which the aperture must be varied in two mutually perpendicular directions. This feature is clearly pointed out in a paper entitled "Photoradio Apparatus and Operating Technique Improvements" by Callahan, Whitaker and Shore, which appeared in the Proceedings of the Institute of Radio Engineers, volume 23, No. 12, December, 1935, page 1441 through 1482. This paper likewise shows and describes a facsimile system and scanning head for which my invention is particularly adapted to work with.

In the paper, as was described in the above mentioned journal, individual adjustments were provided for regulating the height and the width of the aperture in the diaphragm of the optical system of the scanning head. It will be readily appreciated that when the aperture is of the size of 100th inch by 100th inch, that these adjustments become very critical and in order to overcome this, I have provided a ready means, whereby any one of a number of predetermined aperture sizes may be selected easily and readily, and which apertures once selected, may be placed and held in register with the optical system. By my invention, it therefore becomes a very simple matter to change the optical system for optimum scanning whenever the speed of transmission or fineness of scansion is changed. These changes occur as was pointed out in the Proceedings of the Institute of Radio Engineers' paper, when the radio transmission path conditions change from its usual value to either abnormal or subnormal conditions, and consequently, by my invention, relatively no time is lost in changing the adjustments of the scanning head.

Accordingly, my main object is to provide an improved optical system which is new and novel, and has the useful result of readily adjusting the aperture size of a scanning optical system.

A further object of my invention is to provide an improved aperture system for use with scanning apparatus for facsimile or television.

A still further object of my invention is to provide an aperture system for a scanning optical system which is easily maintained and cleaned and does not require a skilled attendant to adjust.

Other ancillary objects will become apparent to those skilled in the art upon consideration of the invention which I have disclosed in the following description, taken with the appended claim, and the accompanying drawing, in which Fig. 1 shows a front view of the assembly of the optical system and the apertured disk;

Fig. 2 shows a sectional view 2—2 of Fig. 1;

Fig. 3 shows the apertured disk; and

Fig. 4 shows the diaphragm spring.

The objects of my invention are attained by providing a disk diaphragm in which a plurality of apertures are cut, each aperture being one of predetermined size, and being located on a circle whose center coincides with the center of the disk. The disk is mounted on a pin which is located eccentrically with the optical axis of this system with which the disk is to cooperate, and the distance of the apertures from the center of the disk is so chosen that they coincide with the axis of the optical system, i. e., the disk rotates about a center, which is displaced from the optical center equal to the distance between the center of the disk and the circle of apertures. A series of notches are cut on the periphery of the disk aperture and against the edge of the disk bears a spring having a V-shaped lip. When the disk is rotated so that the notch and V-shaped lip of the spring coincide, the disk is locked firmly in position and the notches are so located with respect to the apertures that the aperture is brought into alignment with the optical system.

Diametrically opposed to each of the apertures and located on a circle whose radius is greater than the circle apertures, are appropriate identification marks, which may be simply letters, or may give the size of the aperture as to both height and width thousandths of inches. Thus, as the disk is rotated, each of the apertures is brought into alignment and locked in place by the notches, at the same time there appearing an identification mark indicating which aperture is in alignment with the optical system.

In back of the apertured disk is placed a plate which has a conical aperture cut therein, which coincides with the axis of the optical system and which aperture has its smallest dimension larger than any of the apertures in the disk.

Suitable means are likewise provided for protecting the disk from mechanical injuries and the entire assembly is, therefore, one of great simplicity, which permits the ready selection of any one of the apertures and which, at the same time, provides means for locking the selected aperture in register with the optical axis of the system. To expedite the cleaning of the apertures in the disk, a hole is cut in the shield which protects the disk. This permits the apertures within the disk to be easily cleaned either by blowing air through, or by introducing a single or double horse-hair, as is conventional practice in the art.

Referring now to the drawing, Fig. 1 shows a diaphragm disk in which a plurality of apertures, six in number, are shown. It will be readily appreciated, of course, that more or fewer apertures may be used. Along the periphery of the disk 1, which is made of thin metal, such as phosphor bronze, or steel, are cut V-shaped notches 5, which are to cooperate as described above with the diaphragm spring 9, shown in Fig. 4, so that the lip 11 engages with one of the notches 5, and serves to lock the diaphragm in position so that one of the apertures is placed in register with the optical system.

Referring now to Figs. 1 and 2, which bear the same legend numbers for identical parts, it will be noticed that the disk 1 is mounted eccentrically with the optical system by means of the combined screw and pin 17. The mechanical shield is shown at 13 and the hole cut therein to permit access to the aperture is shown at 29. Screws 25 and 27 serve to hold the shield for the diaphragm onto the barrel 15, in which is mounted the optical system. Screw 25 also holds in place the spring 9, which serves to lock the selected aperture in place as described above. The optical system shows only one of the lenses 21, which is held in place by a split ring 19. It will be appreciated, of course, that a more complicated optical system employing several lenses may be used.

The back plate 23 with the conical aperture cut therein permits the light picked up by the optical system to be transmitted toward the rear, and the barrel is generally utilized in conjunction with a photosensitive device for facsimile or television work, although, as will be readily understood, the aperture system described can be used in any optical system requiring variable apertures.

The disk 1 has engraved, stamped, painted, or printed thereon identification marks 29 which are located diametrically opposite their respective apertures and which are placed on a circle of greater radius than the apertures. As shown, the identification marks consist of two numerals which give the height and width of the slots in thousandths of inches, but it will be readily appreciated that the identification marks may be simply one numeral running from one through 6 consecutively or may be letters of the alphabet, or any other mark which would serve to identify the individual apertures. The shield 13, which serves to guard the disk 1 from mechanical injuries is cut away at the top so that identification marks 29 associated with each of the apertures 3 are immediately indicated whenever the spring 9 engages with one of the notches 5.

Having described my invention, what I claim as new and desire to secure by Letters Patent is:

In combination a lens, a mounting for said lens, a disk diaphragm supported from the lens mounting, said diaphragm having a serrated periphery a plurality of spaced varying sized apertures each spaced a predetermined radial distance from a fixed point, a plurality of position marking indicia, each index being positioned diametrically opposite its respective aperture, an apertured shield supported from the lens mounting, and a lipped spring member likewise supported from the mounting to engage with the serrated periphery of the diaphragm for locking any one of the apertures in register with the axis of the lens and simultaneously locking one of the other of the apertures in register with the aperture of the shield.

WILLIAM KIMMICH.